US008099873B2

(12) United States Patent
Eto et al.

(10) Patent No.: US 8,099,873 B2
(45) Date of Patent: *Jan. 24, 2012

(54) ELECTRIC-POWERED CUTTING MACHINE WITH BLADE HOLDING MECHANISM

(75) Inventors: Naoya Eto, Ibaraki (JP); Shinichi Sakuma, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/790,013

(22) Filed: Apr. 23, 2007

(65) Prior Publication Data

US 2007/0193041 A1 Aug. 23, 2007

Related U.S. Application Data (63) Continuation of application No. 10/419,169, filed on Apr. 21, 2003, now Pat. No. 7,216,434.

(30) Foreign Application Priority Data

Apr. 22, 2002 (JP) ................................ P2002-118847
Nov. 1, 2002 (JP) ................................ P2002-320346

(51) Int. Cl.
*B23D 51/10* (2006.01)
*B27B 19/09* (2006.01)
*B23D 51/08* (2006.01)
*B27B 19/02* (2006.01)

(52) U.S. Cl. ............ 30/394; 30/339; 30/392; 83/698.31; 83/699.21; 279/77

(58) Field of Classification Search ..................... 30/337, 30/338, 339, 392, 393, 394; 83/698.31, 698.71, 83/699.21; 279/76, 77, 79
See application file for complete search history.

(56) References Cited

U.S. PATENT DOCUMENTS

| 5,306,025 A | 4/1994 | Langhoff ......................... 279/90 |
| 5,487,221 A | 1/1996 | Oda et al. ......................... 30/392 |
| 5,647,133 A | 7/1997 | Dassoulas ......................... 30/392 |
| 5,697,279 A | 12/1997 | Schnizler et al. ........... 83/698.31 |

(Continued)

FOREIGN PATENT DOCUMENTS

DE        41 02 011 A1    12/1991

(Continued)

OTHER PUBLICATIONS

Chinese Office Action dated Oct. 22, 2004, with English translation.

(Continued)

*Primary Examiner* — Clark F. Dexter
(74) *Attorney, Agent, or Firm* — McGinn IP Law Group, PLLC (57) ABSTRACT

An electric-powered cutting machine includes a reciprocable plunger held by and protruding outward from a housing; an operation member capable of being pivoted on the housing; and a blade holding mechanism disposed at a tip end portion of the plunger, the blade holding mechanism causing a blade to be detachably attached to the plunger. The operation member includes an operation portion and an abutting portion, wherein a distance from the operation portion to a rotating fulcrum is longer than a distance from the abutting portion to the rotating fulcrum. The blade holding mechanism is biased and is capable of swinging, and the blade holding mechanism includes a rotating member capable of being pressed against a side of the blade, wherein the abutting portion abuts against the rotating member when the operating member swings, and wherein the blade is detachably attached to the plunger by swinging of the rotating member.

17 Claims, 10 Drawing Sheets

U.S. PATENT DOCUMENTS

| | | | | |
|---|---|---|---|---|
| 5,722,309 | A | 3/1998 | Seyerle | 83/699.21 |
| 5,794,352 | A | 8/1998 | Dassoulas | 30/392 |
| 5,941,153 | A | 8/1999 | Chang | 83/662 |
| 6,009,627 | A | 1/2000 | Dassoulas et al. | 30/392 |
| 6,023,848 | A | 2/2000 | Dassoulas et al. | 30/392 |
| 6,295,736 | B1 | 10/2001 | Dassoulas et al. | 30/392 |
| 6,357,124 | B1 | 3/2002 | Wall et al. | 30/376 |
| 6,735,876 | B2 | 5/2004 | Hirabayashi | 30/392 |
| 2002/0014014 | A1 | 2/2002 | Dassoulas et al. | 30/392 |

FOREIGN PATENT DOCUMENTS

| | | |
|---|---|---|
| GB | 2 328 643 A | 3/1999 |
| JP | 6-66920 | 9/1994 |
| JP | 2001-179534 | 7/2001 |

OTHER PUBLICATIONS

European Search Report dated Aug. 5, 2003.
Japanese Office Action dated Mar. 27, 2008, with English translation.

PRIOR ART

ELECTRIC-POWERED CUTTING MACHINE WITH BLADE HOLDING MECHANISM

CROSS REFERENCE TO RELATED APPLICATIONS

The present application is a Continuation of U.S. application Ser. No. 10/419,169, filed on Apr. 21, 2003 now U.S. Pat. No. 7,216,434.

BACKGROUND OF THE INVENTION

1. Field of the Invention

The present invention relates to a jigsaw type electric-power cutting machine having a blade holding mechanism.

2. Background Art

A conventional electric-powered cutting machine will be described with reference to FIGS. 1 and 18, taking a jigsaw as an example.

Figure 1:
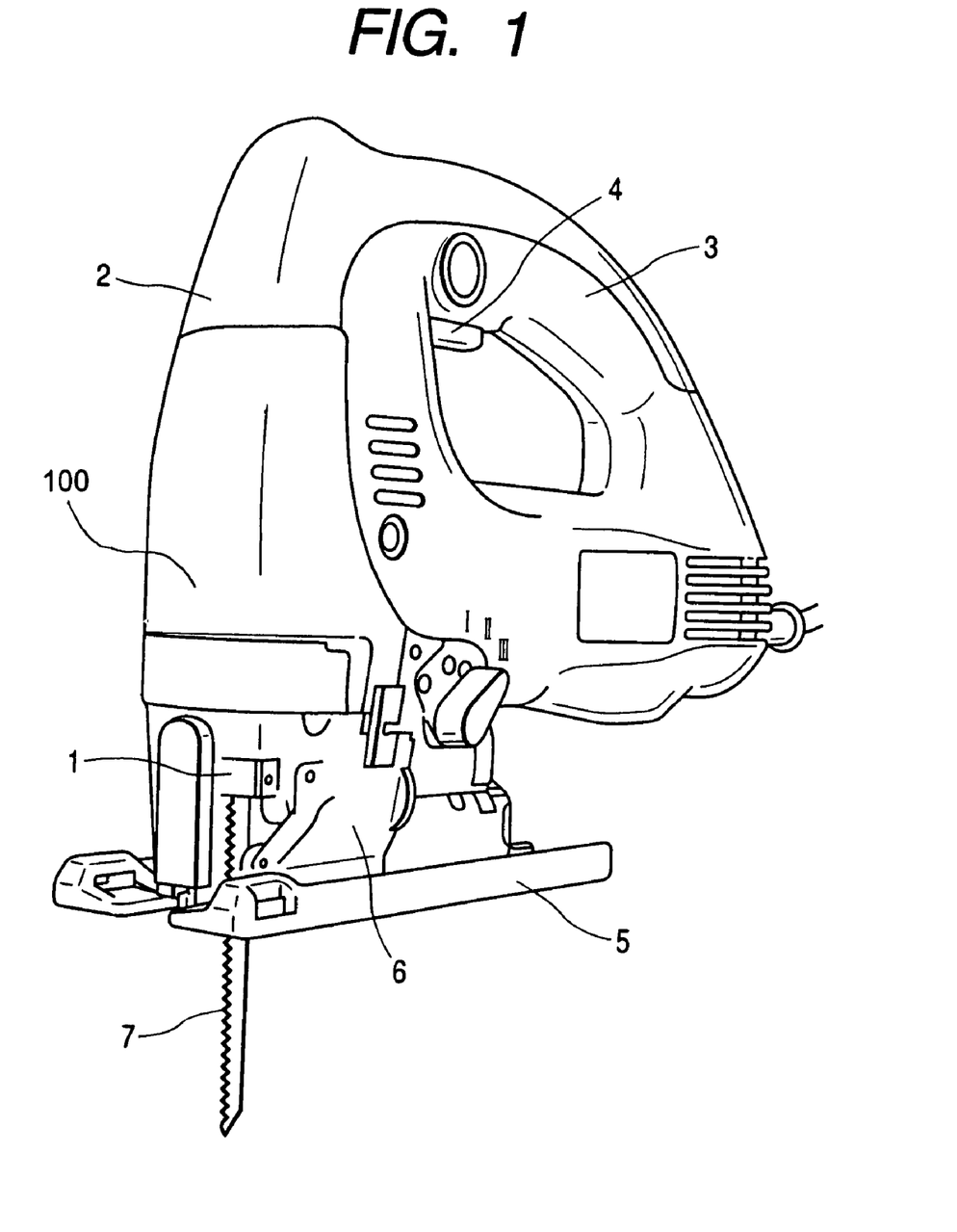
FIG. 1 is a perspective view showing an embodiment of the electric-powered cutting machine of the invention.

As shown in FIG. 1, a jigsaw includes: a housing 2 which has a switch 4 and a handle 3, in which a base 5 that serves as a guiding member during a cutting operation is attached to a lower side, and which houses an electric motor 100 as is known in the art and that is schematically shown in FIG. 1; and a plunger 1 which reciprocates in the vertical directions in the figure by a turning force of the electric motor 100. In the illustrated jigsaw, the plunger 1 is covered by a cover 6 which is formed by a transparent member. An upper portion of the plunger 1 is reciprocatively held inside the housing 2, and a lower portion protrudes to the outside from the housing 2. A blade 7 is detachably held by the lower portion of the plunger 1.

Figure 18:
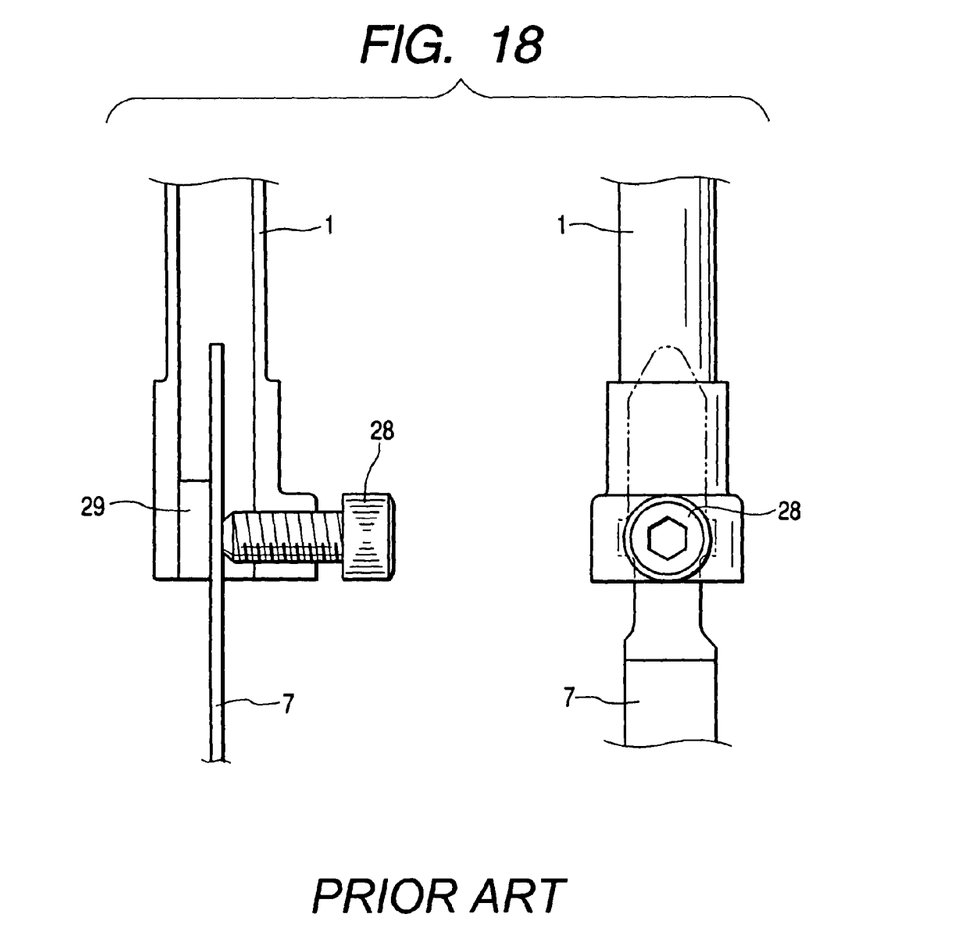
FIG. 18 shows an enlarged front view of main portions and a side view showing an example of a conventional electric-powered cutting machine.

As shown in FIG. 18, the conventional jigsaw has a configuration in which a locking screw 28 that presses against a flat face of the blade 7, and a support member 29 that supports a flat face of the blade 7 on the side opposite in the pressing direction are attached to the tip end of the plunger 1. When the blade 7 is inserted into the plunger 1, the blade 7 can be fixed to the plunger 1 by fastening the locking screw 28.

However, the above-mentioned configuration has the inconvenience that it is necessary to use a tool for operating the locking screw 28 during a work of replacing the blade 7. Apparently, the fastening force acting on the locking screw 28 is variously changed depending on the worker, thereby causing a problem in that, when the fastening force is excessively large, the blade 7 is deformed.

As a jigsaw for solving the problem, European Patent Nos. 722,802 and 855,239 disclose a configuration in which a work of replacing a blade can be conducted without using a tool or the like.

SUMMARY OF THE INVENTION

Among the conventional jigsaws, the jigsaw disclosed in European Patent No. 722,802 is configured in the following manner. When a lever disposed on the tip end of a plunger is operated without using a tool, two projections. for preventing a blade from slipping off are engaged with a wall face which is perpendicular to a tip end face of the plunger, whereby the blade can be fixed easily and irrespective of a force exerted by the worker.

Since the lever having a relatively large size is disposed on the tip end of the plunger, the plunger is heavy. Therefore, the jigsaw has a disadvantage that, during a cutting work, the plunger largely vibrates. In the plunger, an opening for inserting a blade is not clearly formed. In a work of inserting a blade into the plunger, therefore, the blade may be erroneously inserted with being inclined. In this case, there is the possibility that the blade is fixed while maintaining the inclined state. Such an inclined blade greatly affects the cutting accuracy.

The jigsaw disclosed in European Patent No. 855,239 has a configuration which can solve the problem in the blade fixing method by screwing, in the same manner as that disclosed in European Patent No. 722,802, and in which the problem discussed with respect to that disclosed in European Patent No. 722,802 is solved by disposing a clear opening for inserting a blade, and by performing the fixation through a remote operation using a lever that is disposed in a place different from the plunger.

In the configuration, a spring pressing a moving member must be designed so that the spring can be placed in a gap formed between the moving member and an outer hull, while the gap is narrowed by the remote operation using the lever. When the lever is released and the moving member is moved to a position where the member presses the blade, the spring is stretched to some extent and the pressing force is lost. In order to compensate the pressing force, therefore, a number springs must be placed in the gap. As a result, the total weight of the plunger is increased. In a jigsaw in which a plunger reciprocates at a high speed, the increased weight tends to adversely affect vibrations of the main unit of the jigsaw.

It is an object of the invention to provide a jigsaw which can eliminate the above-discussed disadvantages, and in which, without increasing the weight of a plunger, vibrations during a cutting work can be suppressed and blade replacement can be conducted easily and in a short time.

The object can be attained by configuring a blade holding mechanism so as to comprise: a blade receiving face including a groove having a shape which is substantially identical with a shape of an attachment portion of a blade including projections; a swinging member having: one end which has a swing fulcrum that elongates in a direction substantially identical with a longitudinal direction of a plunger, and a blade pressing portion that can be placed in a place opposed to the groove; and another end which elongates to separate from the plunger; and a pressing member which presses the one end of the swinging member toward the groove of the plunger.

BRIEF DESCRIPTION OF THE DRAWINGS

The present invention may be more readily described with reference to the accompanying drawings.

DETAILED DESCRIPTION OF THE PREFERRED EMBODIMENTS

Figure 2:
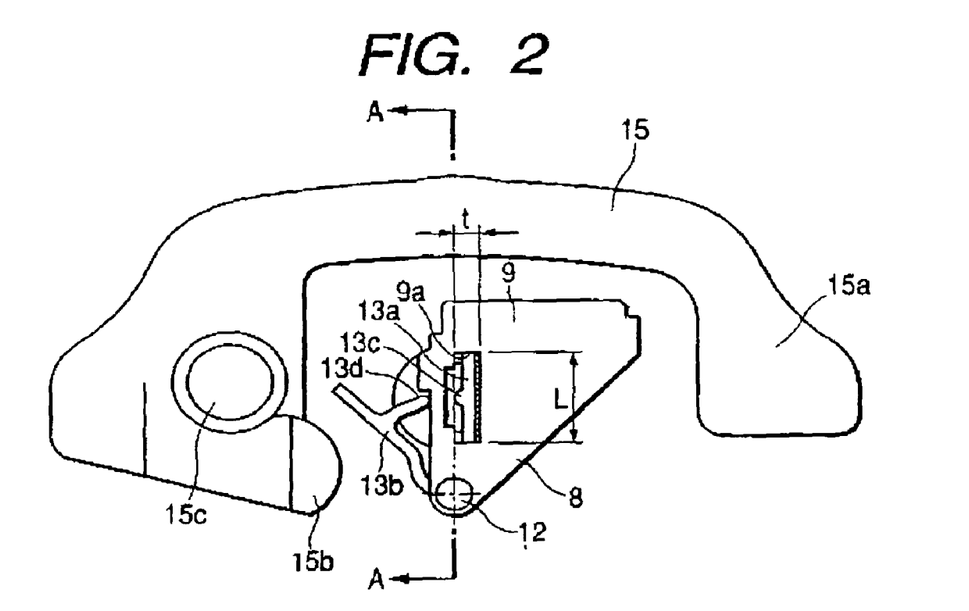
FIG. 2 is an enlarged bottom view of main portions showing the embodiment of the electric-powered cutting machine of the invention.

An embodiment of the jigsaw of the invention will be described with reference to FIGS. 1 to 10. FIG. 1 is a perspective view showing a state where the blade 7 is attached to a tip end portion of the plunger 1, FIG. 2 is an enlarged bottom view of main portions showing a blade holding mechanism, FIG. 3 is a section view taken along the line A-A in FIG. 2, and FIG. 4 is a section view taken along the line B-B in FIG. 3.

Figure 5:
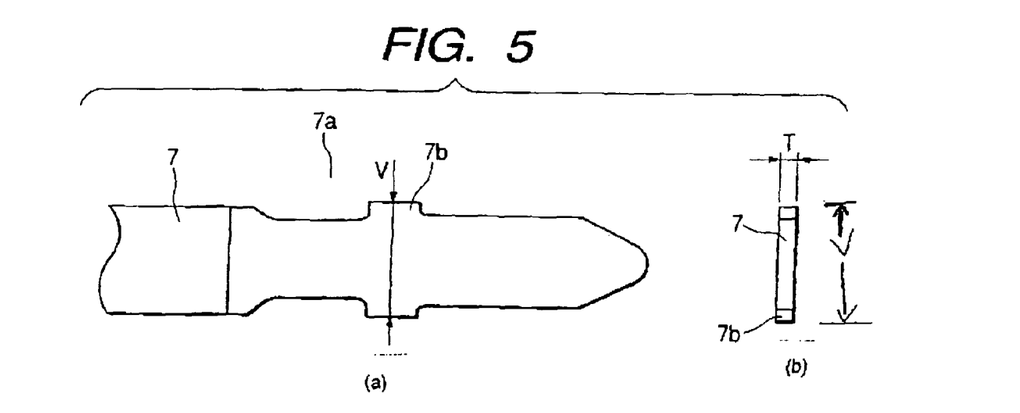
FIG. 5 (views *a* and *b*) shows an enlarged front view of main portions and a side view showing an example of a blade.

As shown in FIG. 5, the blade 7 which can be attached to and detached from the jigsaw of the invention has an attachment portion 7a including a pair of projections 7b which elongate perpendicular to the longitudinal direction of the blade 7.

A blade holding portion 8 is disposed in the tip end of the plunger 1 as shown in the figures. A bottom face 9 which extends perpendicular to the longitudinal direction of the plunger 1, and in which a hole 9a is formed, is disposed on the blade holding portion 8 on the side of the base 5. The hole 9a has a thickness (see FIG. 2) which is smaller than the width T of the attachment portion 7a of the blade 7, and a dimension L which is larger than a dimension V between the projections 7b. The dimension V is the maximum width of the attachment portion 7a of the blade 7. The blade holding portion 8 has an upper face 10 which extends in parallel with the bottom face 9, and which is positioned in the vicinity of the lower end face of the plunger 1. A blade receiving face 11 which extends substantially parallel to the longitudinal direction of the plunger 1 is positioned between the bottom face 9 and the upper face 10 and in the vicinity of the middle of the plunger 1.

Figure 3:
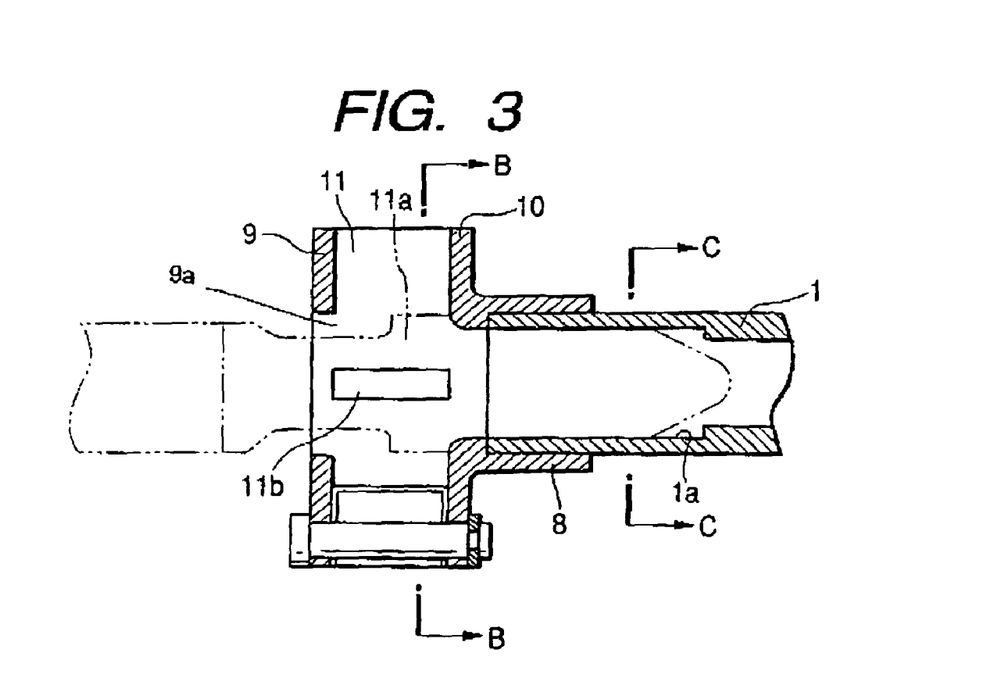
FIG. 3 is a section view taken along the line A-A in FIG. 2.
Figure 4:
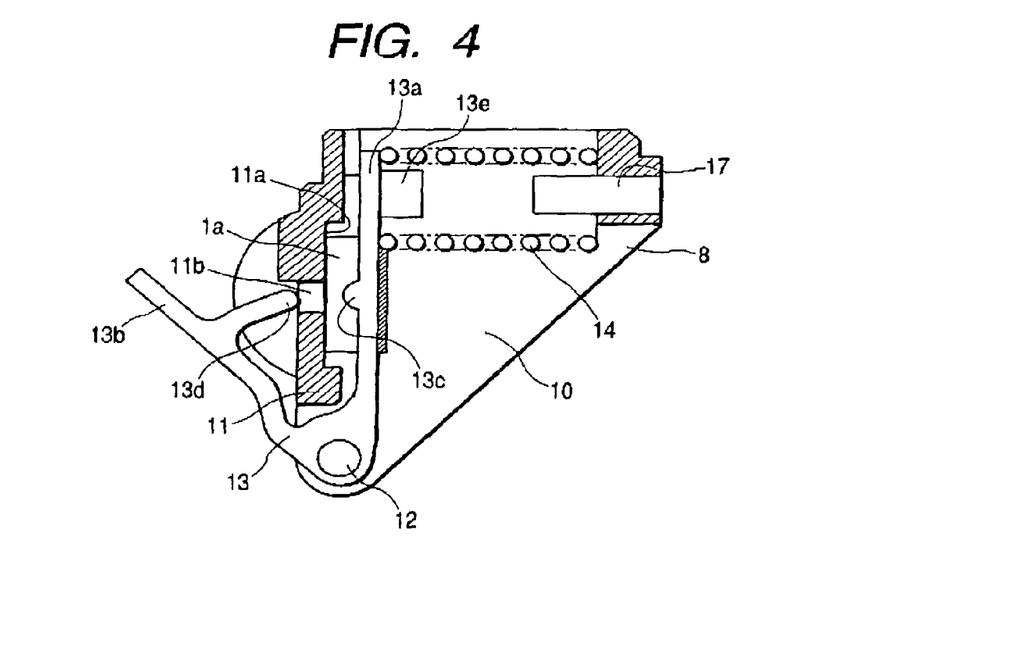
FIG. 4 is a section view taken along the line B-B in FIG. 3.

As shown in FIG. 3, a groove 11a having a shape which is substantially identical with that of the attachment portion 7a of the blade 7 is formed in the blade receiving face 11. The hole 9a of the bottom face 9 communicates with the groove 11a.

A pin 12 which is held by the upper face 10 and the bottom face 9 of the blade holding portion 8 is disposed between the upper face 10 and the bottom face 9. A swinging member 13 which uses the pin 12 as a swing fulcrum is held by the blade holding portion 8.

As shown in FIG. 4, the swinging member 13 has an approximately V-like shape, and is attached so that the pin 12 serving as a swing fulcrum is positioned in a substantially middle portion of the member. One end 13a of the member is always pressed toward the blade receiving face 11 by a spring 14 which is a pressing member for pressing an end portion of the member. The one end 13a of the swinging member 13 has a shape which can be placed substantially parallel to the blade receiving face 11, and has a hemispherical convex portion 13c in a place corresponding to the middle portion of the groove 11a. The convex portion protrudes toward the groove 11a to serve as a blade pressing portion. The center position of the pin 12 is located substantially on an extended line of the blade receiving face 11, whereby the one end 13a of the swinging member 13 is allowed to be easily placed substantially parallel to the blade receiving face 11 as described above.

Although the one end 13a of the swinging member 13 is positioned between the upper face 10 and the bottom face 9 of the blade holding portion 8, the other end 13b is not positioned between the upper face 10 and the bottom face 9, and has a shape which elongates so as to separate from the blade receiving face 11 or radially outwardly separate from the plunger 1.

Figure 6:
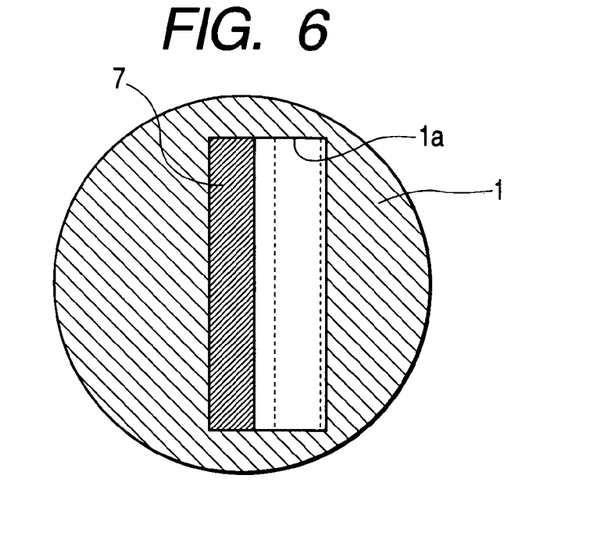
FIG. 6 is a section view taken along the line C-C in FIG. 3.

As shown in FIGS. 4 and 6, a hole 1a having an inner wall face which is substantially flush with the face of the groove 11a is formed in the plunger 1. When the blade 7 is attached, an end of the attachment portion 7a of the blade is positioned in the hole 1a of the plunger 1.

In the housing 2, a lever 15 which serves as an operation member, and which has a swing fulcrum 15c that elongates in a direction substantially identical with the longitudinal direction of the plunger 1 is disposed on the housing 2 so as to cover the blade holding portion 8. In the lever 15, an abutting portion 15b which can abut against the other end 13b of the swinging member 13 is disposed at a position close to the swing fulcrum 15c, and an operation portion 15a is formed in a place which is remote from the abutting portion 15b.

The lever 15 is pressed by a pressing member such as a torsion spring which is not shown, so as to be located at the position shown in FIG. 2. The lever can be swung with using the swing fulcrum 15c as a fulcrum, by operating the operation portion 15a.

Figure 7:
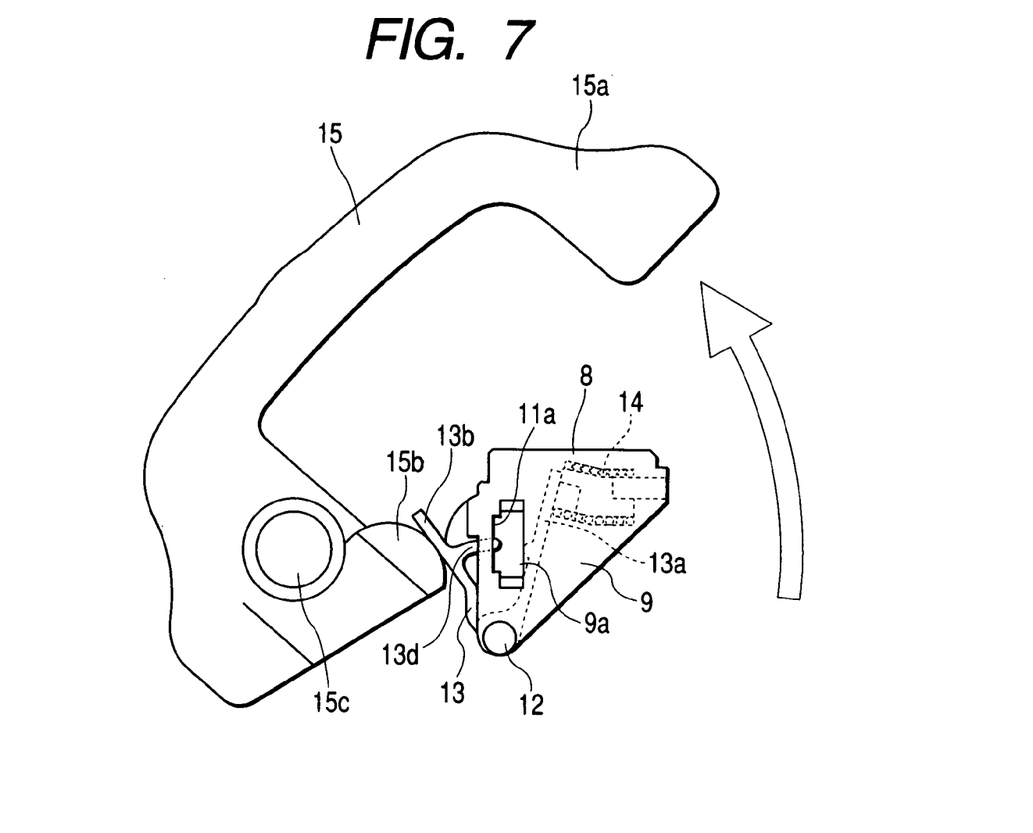
FIG. 7 is an enlarged bottom view of main portions showing an operation state of the electric-powered cutting machine of the invention.

When the lever 15 is swung, as shown in FIG. 7, the abutting portion abuts against the other end 13b of the swinging member 13. When the lever 15 is further swung, the shape of the abutting portion 15b causes the swinging member 13 to be swung so that the other end 13b of the swinging member 13 is moved toward the blade receiving face 11 against the pressing force of the spring 14.

When the operation of swinging the lever 15 is cancelled in the state of FIG. 7, the lever 15 is returned to the state shown in FIG. 2 by the pressing member (not shown). As previously described, the pressing member can be formed by a torsion spring. In accordance with this returning operation, the swinging member 13 is swung by the urging force of the spring 14 so that the one end 13a is moved toward the blade receiving face 11, and the other end 13b is moved to radially outwardly separate from the plunger 1, with the result that also the swinging member 13 is returned to the state shown in FIG. 2.

Next, the operation to be performed. when the blade 7 is attached to the blade holding portion 8 will be described.

First, the lever 15 is swung against the pressing member as described above to cause the swinging member 13 to swing against the pressing force of the spring 14. The lever 15 is then held to the state shown in FIG. 7.

Figure 8:
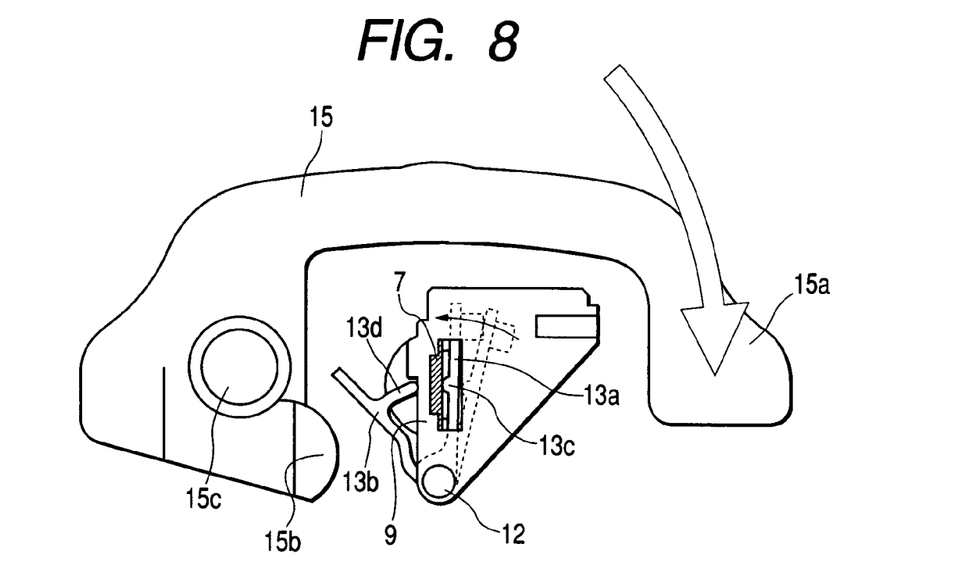
FIG. 8 is an enlarged bottom view of main portions showing an operation state of the electric-powered cutting machine of the invention.
Figure 9:
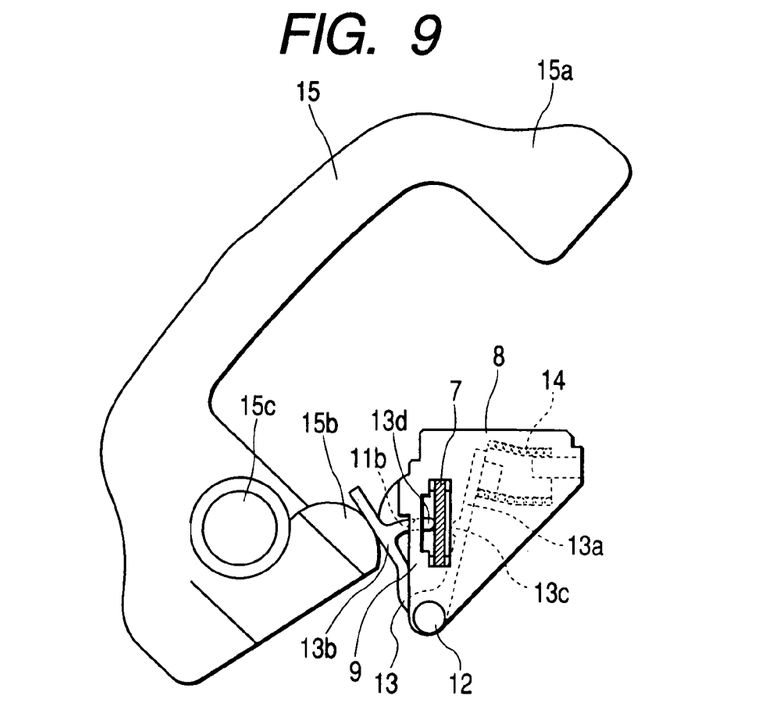
FIG. 9 is an enlarged bottom view of main portions showing an operation state of the electric-powered cutting machine of the invention.

In this state, the attachment portion 7a of the blade 7 is inserted into the blade holding portion 8 via the hole 9a of the bottom face 9 of the blade holding portion 8. The attachment portion 7a of the blade 7 is then engaged with the groove 11a of the blade receiving face 11, and the holding of the lever 15 is cancelled. As shown in FIG. 8, therefore, the lever 15 is returned to the state shown in FIG. 2, and also the swinging member 13 is returned to the state shown in FIG. 2. This causes the convex portion 13c on the one end 13a of the swinging member 13 to press the flat face of the attachment portion 7a of the blade 7 engaged with the groove 11a. As a result, the work of attaching the blade 7 to the blade holding portion 8 is ended.

The blade 7 attached to the blade holding portion 8 is prevented from downward slipping off, by the projections 7b of the blade 7 and the groove 11a opposed to the projections 7b. The upward movement of the blade 7 is. restricted by butting of the upper faces of the projections 7b of the blade 7 against the inner wall face of the upper face of the blade holding portion 8.

Figure 10:
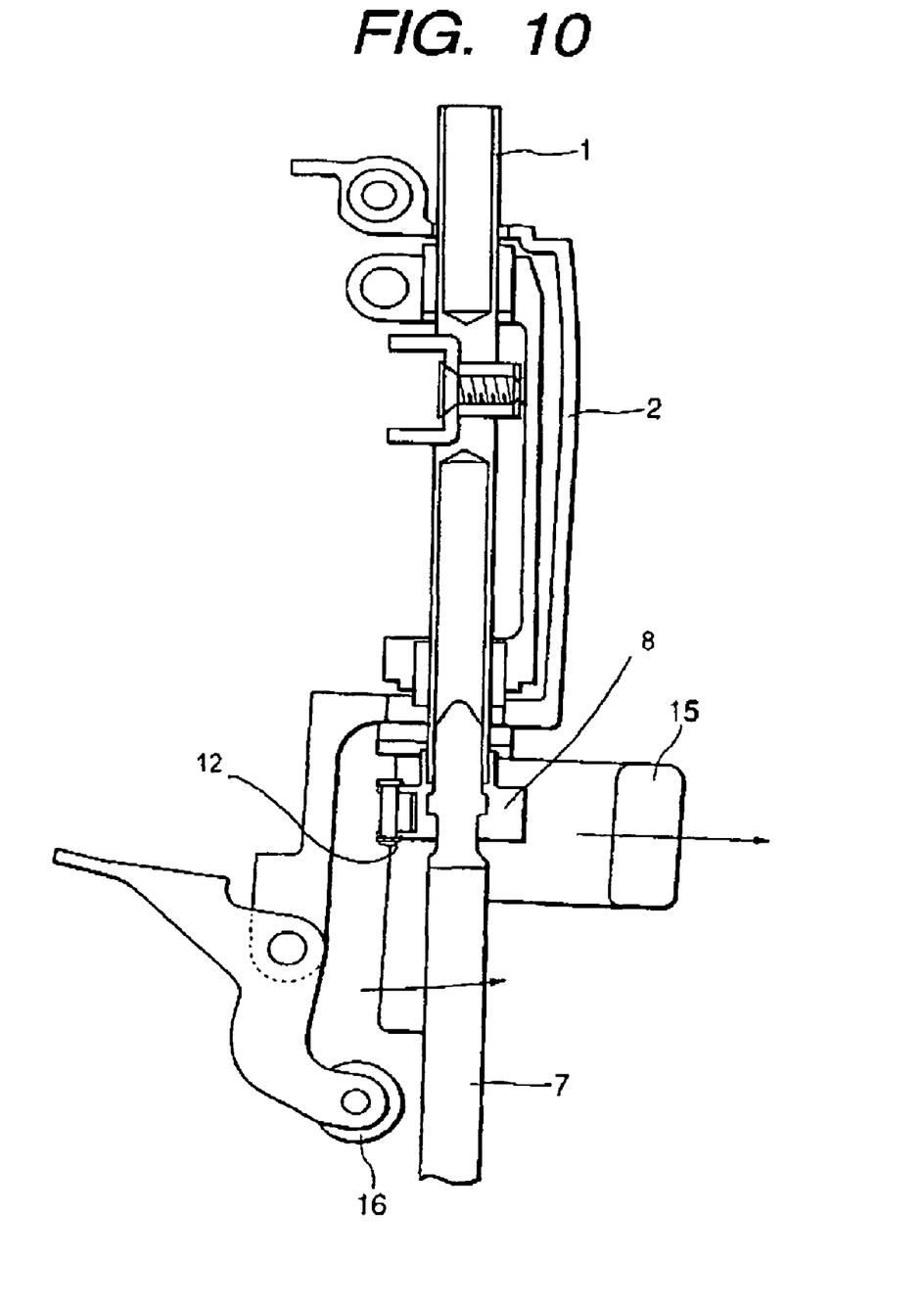
FIG. 10 is an enlarged bottom view of main portions showing an operation state of the electric-powered cutting machine of the invention.

In the jigsaw of the embodiment, as shown in FIG. 10, the abutting portion 15b of the lever 15 has a shape which elongates in a direction substantially identical with the longitudinal direction of the plunger 1. This configuration is employed because of the following reason. Even when the blade holding portion 8, i.e., the other end 13b of the swinging member 13 against which the abutting portion 15b abuts is at any position in the reciprocal motion range of the plunger 1, the abutting portion 15b of the lever 15 can abut against the other end 13b of the swinging member 13 to enable the blade 7 to be attached or detached.

The jigsaw of the embodiment is configured so that, as shown in FIG. 2, a through hole 11b which communicates with the groove 11a is formed in the blade receiving face 11. A projecting portion 13d is capable of being inserted into the through hole 11b to protrude into the groove 11a. The projecting portion 13d is disposed on the other end 13b of the swinging member 13. According to the configuration, when the lever 15 is swung in the work of detaching the blade 7, the projecting portion 13d functions to cause the blade 7 to automatically slip off from the blade holding portion 8, whereby the workability of the replacement of the blade 7 is improved.

The jigsaw of the embodiment is configured so that the plunger 1 is rockable in the cutting direction. The jigsaw has a roller 16 for abutting against a face of the blade 7. The face is a rear face with respect to the cutting direction. The pin 12 which serves as the swing fulcrum of the swinging member 13 is positioned more rearward in the cutting direction than the center of the plunger 1 in order that, during an operation of attaching or detaching the blade 7, the plunger 1 can rock in a direction along which the plunger separates from the roller 16, i.e., toward the forward side in the cutting direction as shown in FIG. 10. When the abutting portion 15b of the lever 15 abuts against the other end 13b of the swinging member 13, a moving force acts toward the forward side in the cutting direction. According to the configuration, the work of replacing the blade 7 can be conducted without being hindered by the roller 16, whereby the workability can be improved.

As described above, the pressing force of the spring 14 serving as the pressing member acts on the vicinity of the end portion of the one end 13a of the swinging member 13 having the swing fulcrum. According to the principle of the lever, therefore, a greater pressing force can be given to the blade 7 via the convex portion 13c. In other words, it is not necessary to dispose plural springs 14 or the spring 14 of a larger size in order to obtain a pressing force which is required at minimum. Therefore, the weight of the blade holding portion 8 can be relatively reduced, so that vibrations. which are caused during reciprocal motion of the plunger 1 can be suppressed. As shown in FIG. 2, the pin 12 which serves as the swing fulcrum of the swinging member 13 is placed at a position which is separated from the outer periphery of the plunger 1, and the place where the spring 14 presses the one end of the swinging member 13 is set to the vicinity of the end portion of the one end 13a, whereby the pressing force of the convex portion 13c acting on the blade 7 can be further enhanced. A convex portion 13e which is disposed on the one end 13a of the swinging member 13 so as to protrude toward the spring 14, and a pin 17 attached to the blade holding portion 8 prevent the spring 14 from slipping off from the blade holding portion 8.

As described above, the convex portion 13c is disposed on the one end 13a of the swinging member 13 as a pressing member with a hemispherical shape. The convex portion 13c presses the flat face of the blade 7 engaged with the groove 11a of the blade receiving face 11. Even when another blade 7 having a different width is inserted, therefore, the pressing force of the spring 14 acts on a substantially middle portion of the blade 7 via the convex portion 13c.

In the jigsaw of the embodiment, after the blade 7 is inserted into the blade holding portion 8 through the hole 9a of the bottom face 9, the blade 7 must be moved in the direction perpendicular to the longitudinal direction to cause the attachment portion 7a of the blade 7 to be engaged with the groove 11a of the blade receiving face 11. In the configuration of the embodiment, when the operation of the lever 15 is cancelled in the state where the blade 7 is inserted into the blade holding portion 8, the blade is guided by the convex portion 13c of the swinging member 13 to be engaged with the groove 11a. At this time, because the convex portion 13c has a hemispherical shape as described above, the convex portion 13c presses a substantially middle portion of the blade 7, and hence the blade 7 is stably guided into the groove 11a.

As described above, in the blade holding portion 8, the blade 7 must be moved in the direction perpendicular to the longitudinal direction. Therefore, the widths of the hole 1a of the plunger 1 and the hole 9a of the bottom face 9 of the blade holding portion 8 are set to have dimensions which enable the above-mentioned movement of the blade 7.

In the embodiment, the upper face 10 of the blade holding portion 8 is positioned at the upper end of the groove 11a. When the blade 7 is moved as described above in the state where the upper faces of the projections 7b of the blade 7 abut against the inner wall face of the upper face 10 of the blade holding portion 8, therefore, the attachment portion 7a of the blade 7 is engaged with the groove 11a. As a result, the movement of the blade 7 caused by the convex portion 13c of the swinging member 13 is performed more stably, and the position of the blade 7 is set when the blade 7 is inserted into the blade holding portion 8, so that the work of attaching the blade can be easily conducted.

In the embodiment, the blade holding portion 8 is formed as a member which is different from the plunger 1. Alternatively, the blade holding portion may be formed integrally with the plunger 1.

Next, another embodiment of the jigsaw of the invention will be described with reference to FIGS. 11 to 14. The components similar to those of the above-described embodiment are denoted by the same reference numerals, and their description is omitted.

The embodiment has a feature in the shape of the convex portion 13c which is disposed on the one end 13a of the swinging member 13 to function as the blade pressing portion.

Figure 11:
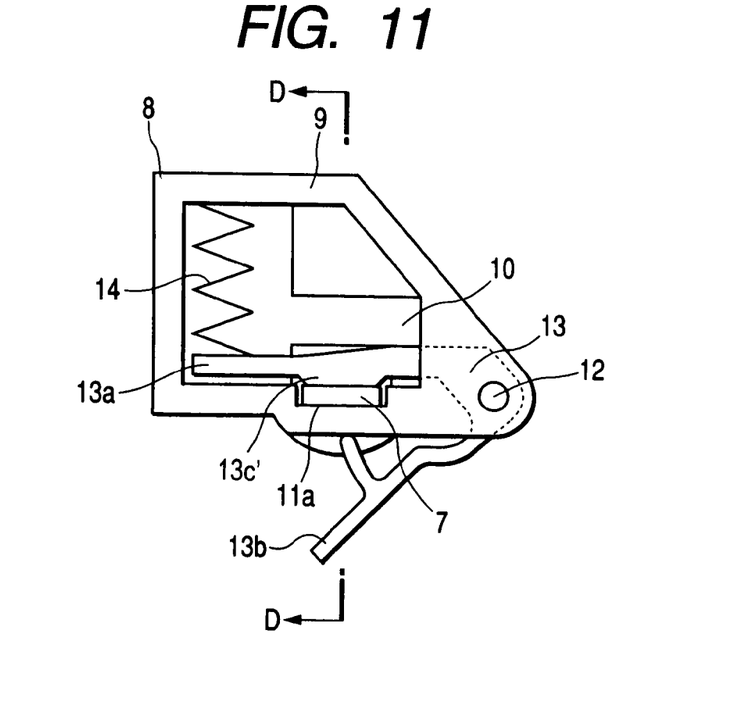
FIG. 11 is an enlarged bottom view of main portions showing another embodiment of the electric-powered cutting machine of the invention.

As shown in the figures, a convex portion 13c' which is disposed on the one end 13a of the swinging member 13, and which presses the flat face of the blade 7 has a width which is slightly smaller than the illustrated width of the groove 11a, and has a shape which can be placed substantially parallel to the groove 11a, so that, when the blade 7 of a width which is more frequently used is engaged with the groove 11a, the convex portion can substantially come into surface contact with the flat face of the blade 7.

In the case of the hemispherical convex portion 13c in the embodiment described above, the flat face of the blade 7 and the convex portion 13c make a point contact, and there is the possibility that the blade 7 is inclined with using the convex portion 13c as a fulcrum. By contrast, according to the above-mentioned configuration, even when the blade 7 of a different width is inserted and butting between the flat face of the blade 7 and the convex portion 13c' is formed by a point contact, the face of a portion of the convex portion 13c' which is not in contact with the flat face functions to suppress the inclination, with the result that the inclination of the blade 7 can be suppressed.

Figure 12:
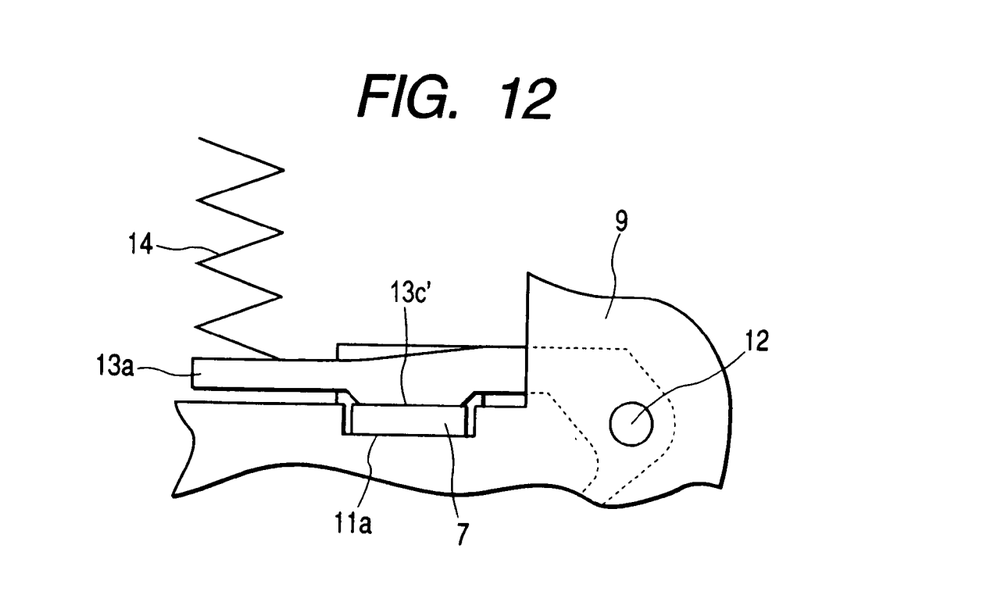
FIG. 12 is an enlarged bottom view of main portions of FIG. 11 showing an operation state of the other embodiment of the electric-powered cutting machine of the invention.
Figure 13:
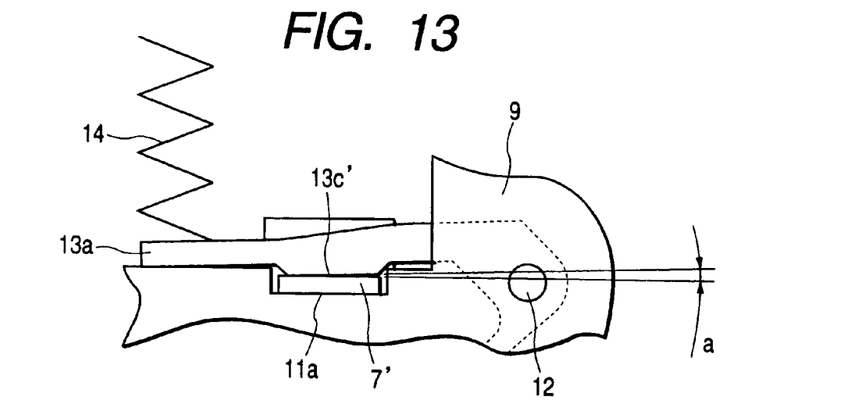
FIG. 13 is an enlarged bottom view of main portions of FIG. 11 showing an operation state of the other embodiment of the electric-powered cutting machine of the invention.
Figure 14:
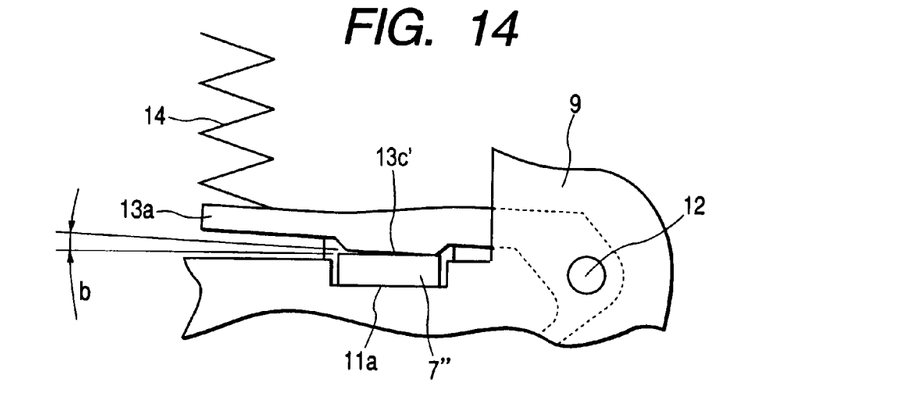
FIG. 14 is an enlarged bottom view of main portions of FIG. 11 showing an operation state of the other embodiment of the electric-powered cutting machine of the invention.

FIG. 12 is an enlarged view of main portions showing a state where the blade 7 of a thickness which is more frequently used is attached, FIG. 13 is an enlarged view of main portions showing a state where a blade 7' of a thickness which is smaller than that of the blade 7 of FIG. 12 is attached, and FIG. 14 is an enlarged view of main portions showing a state where a blade 7" of a thickness which is larger than that of the blade 7 of FIG. 12 is attached.

In the state shown in FIG. 12, the convex portion 13c' and the flat face of the blade 7 are substantially in surface contact. The blade 7 can be almost completely prevented from being inclined to escape from the groove 11a in the illustrated state. By contrast, in the state shown in FIG. 13 or 14, the convex portion 13c' and the flat face of the blade 7' or 7" make a point contact, but the allowable range of the inclination of the blade 7' or 7" is restricted by a portion other than the convex portion 13c' which is in contact with the flat face of the blade 7' or 7". Therefore, it can be seen that the inclination of the blade 7' or 7" can be suppressed to a small degree (approximately the degree of a or b shown in the figures).

Figure 15:
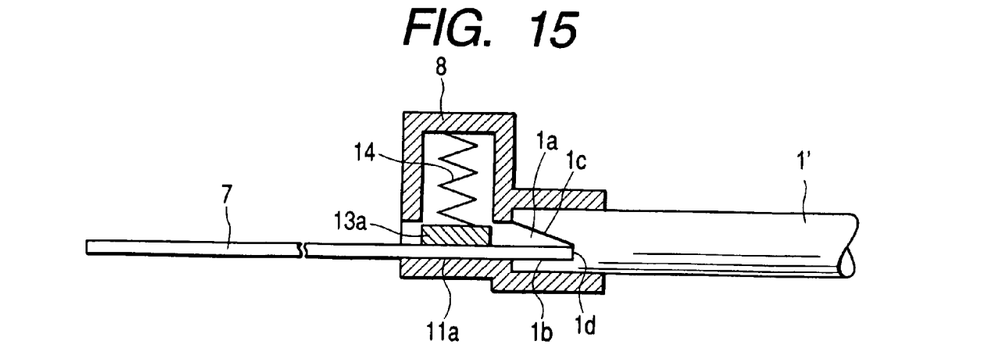
FIG. 15 is a section view taken along the line D-D in FIG. 11 showing the other embodiment of the electric-powered cutting machine of the invention.

Next, a further embodiment of the jigsaw of the invention will be described with reference to FIGS. 15 to 17. The components similar to those of the above-described embodiments are denoted by the same reference numerals, and their description is omitted.

The embodiment has a feature in the shape of the slot 1a formed in the plunger 1', into which the end portion of the attachment portion 7a of the blade 7 is to be inserted.

As shown in the figures, the slot 1a of the plunger 1', has: a first inner wall face 1b which is flush with the groove 11a of the blade receiving face 11; a second inner wall face 1c which is placed to be opposed to the first inner wall face 1b; and a third inner wall face 1d which is opposed to the end face of the blade 7.

The width of the third inner wall face 1d is substantially equal to the maximum width of the blade 7 which can be used. The second inner wall face 1c is formed as an inclined face which is continuous with a portion (an upper portion in the figures) of the third inner wall face 1d that is opposite to the first inner wall face 1b, and which extends to the upper face 10 of the blade holding portion 8.

As described above, to engage the attachment portion 7a of the blade 7 with the groove 11a, the attachment portion 7a must be moved by a distance corresponding to the depth of the groove 11a. Therefore, the slot 1a of the plunger 1' must be formed so as to allow the movement of the blade 7. Consequently, the width of the slot 1a of the plunger 1' cannot be set to be substantially equal to that of the blade 7. As a result, there is the possibility that, when a load is applied to the vicinity of the lower end of the blade 7, the blade is inclined so as to rotate around the convex portion 13c or 13c' pressing the flat face of the blade 7. The movement of the blade 7 is enabled by forming the second inner wall face 1c as an inclined face. The inclination of the blade 7 can be suppressed by setting the width of the third inner wall face 1d to be slightly larger than the thickness of the blade 7.

Figure 16:
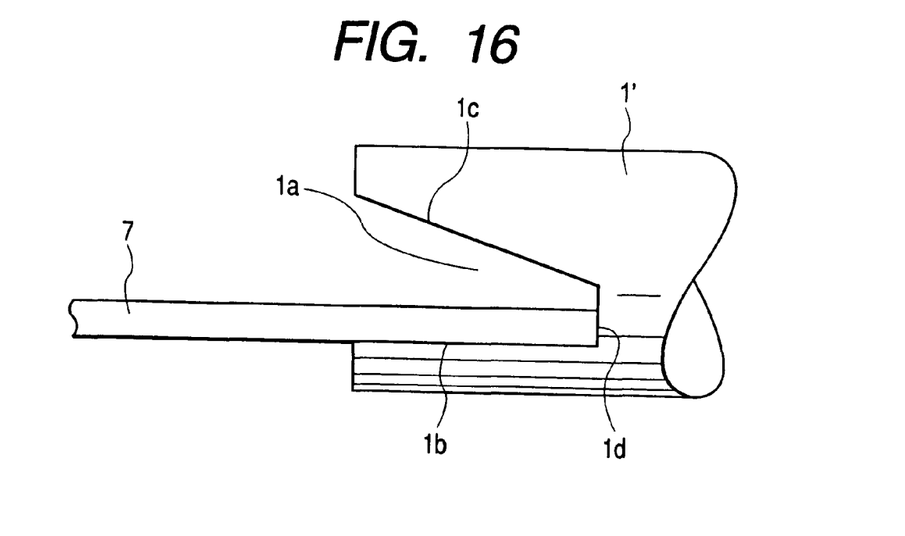
FIG. 16 is an enlarged bottom view of main portions of FIG. 15.
Figure 17:
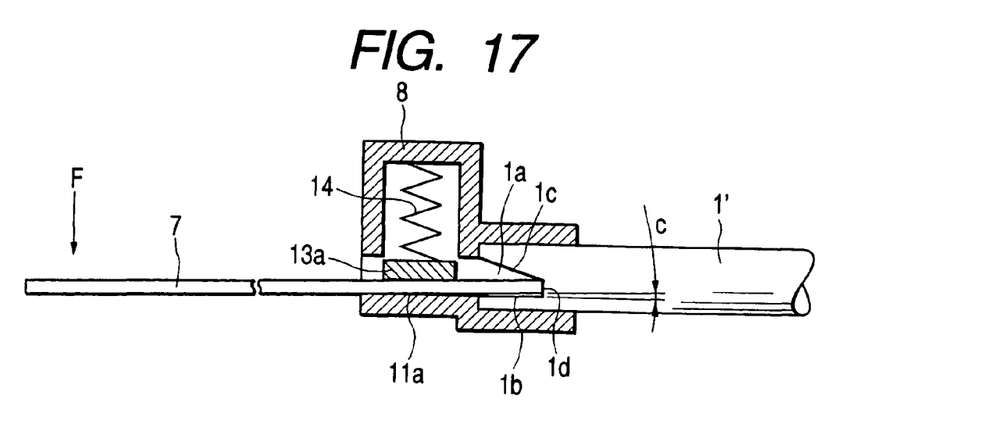
FIG. 17 is a section view taken along the line D-D in FIG. 11 showing an operation state of the other embodiment of the electric-powered cutting machine of the invention.

FIGS. 16 and 17 are section views of main portions showing a state where the blade 7 of a width which is more frequently used is attached. As shown in FIG. 16, the width of the third inner wall face 1d is slightly different from that of the blade 7. As shown in FIG. 17, even when a load in the direction F shown in the figure is applied to the vicinity of the lower end (the left side in the figure) of the blade 7, the end face of the blade 7 on the side of the attachment portion 7a abuts against the second inner wall face 1c, whereby the inclination of the blade 7 is restricted. Therefore, it can be seen that the inclination of the blade 7 can be suppressed to a small degree (approximately the degree of about c shown in the figure).

In the embodiment, the work of attaching the blade 7 can be conducted in the following manner. When the blade 7 is to be inserted into the blade holding portion 8, the blade 7 is inserted with being inclined. with respect to the longitudinal direction of the plunger 1'. The blade 7 is inserted until the end face is substantially contacted with the third inner wall face 1d of the slot 1a of the plunger 1'. Thereafter, the attachment portion 7a of the blade 7 is engaged with the groove 11a by a manual operation or pressing by the convex portion 13c or 13c' of the swinging member 13.

As described above, according to the invention, it is possible to provide a jigsaw in which, without increasing the weight of a plunger, vibrations during a cutting work can be suppressed and blade replacement can be conducted easily and in a short time.

What is claimed is:

1. An electric-powered cutting machine, comprising:
   a housing;
   a plunger held by the housing and protruding outward therefrom, the plunger being driven to reciprocate;
   an operation member rotatably mounted on the housing; and
   a blade holding mechanism disposed at a tip end portion of the plunger, the blade holding mechanism detachably attaching a blade to the plunger, the blade comprising a pair of projections,
   wherein the blade holding mechanism comprises a blade receiving portion including an engaging portion that engages with the projections of the blade,
   wherein the operation member comprises an operation portion and an abutting portion,
   wherein the blade holding mechanism comprises a rotating member and a pressing member that urges the rotating member toward a side of the blade,
   wherein the abutting portion abuts against the rotating member when the operating member rotates in a direction away from an initial position, the initial position being at a rotation end point, thereby causing the rotating member to rotate against a biasing force of the pressing member, wherein the blade is detachably attached to the plunger by a rotation of the rotating member, wherein the abutting portion and the operation portion are disposed at different ends of the operation member with respect to the rotating fulcrum, wherein the rotating member comprises:
 a rotation center around which the rotating member is rotated;
 a first end being urged by the pressing member to press the blade; and
 a second end that is abutted by the abutting portion, wherein, when the operation member is rotated in the direction away from the initial position, the rotating member is rotated through a contact between the abutting portion and the second end so that a pressing force applied from the first end to the blade is released, thereby detaching the blade from the plunger, wherein, when the blade is attached to the blade receiving portion of the blade holding mechanism, the blade is clamped by the blade receiving portion and the first end of the rotating member, and the projections of the blade are engaged with the engaging portion of the blade receiving portion, thereby preventing the blade from moving downward, wherein, when the operation member is in the initial position, the abutting portion, the rotating fulcrum, and the second end are positioned at one side of a line extending along a side surface of the blade, and the operation portion is positioned at another side of the line, and wherein, when viewed from the longitudinal direction of the blade, the distance from the operation portion to the rotating fulcrum is more than two times of the distance from the abutting portion to the rotating fulcrum.

2. The electric-powered cutting machine according to claim 1, wherein the abutting portion of the operation member has a shape such that the abutting portion of the operation member extends substantially parallel to a longitudinal direction of the plunger regardless of a position of the plunger where the plunger has a reciprocating motion, so that the abutting portion abuts against the rotating member.

3. The electric-powered cutting machine according to claim 1, wherein the operation member is biased by the pressing member.

4. The electric-powered cutting machine according to claim 1,
 wherein said first end of the rotating member, which is pressed toward the blade receiving portion by the pressing member, has a shape which can be placed parallel to the blade receiving portion.

5. The electric-powered cutting machine according to claim 4,
 wherein said first end of the rotating member comprises a hemispherical convex portion in a place corresponding to a middle portion of a groove formed in the blade receiving portion.

6. The electric-powered cutting machine according to claim 5, wherein the convex portion protrudes toward the groove to serve as a blade pressing portion.

7. The electric-powered cutting machine according to claim 5,
 wherein an attachment portion of the blade engages with the groove of the blade receiving portion before the blade attaches to the plunger.

8. The electric-powered cutting machine according to claim 4,
 wherein the rotation center of the rotating member is located on an extended line of the blade receiving portion, and
 wherein said first end of the rotating member is placed parallel to the blade receiving portion.

9. The electric-powered cutting machine according to claim 4,
 wherein said first end of the rotating member is positioned between an upper face and a bottom face of the blade holding mechanism, and
 wherein said second end of the rotating member has a shape which elongates to separate from the blade receiving portion or radially outwardly separates from the plunger.

10. The electric-powered cutting machine according to claim 4,
 wherein a curved surface of the abutting portion causes the rotating member to rotate against the biasing force of the pressing member.

11. The electric-powered cutting machine according to claim 4, wherein a projecting member is disposed on the second end of the rotating member,
 wherein when the operation member rotates for detaching the blade, the projecting portion causes the blade to automatically slip off from the blade holding mechanism.

12. The electric-powered cutting machine according to claim 1,
 wherein said rotation center of the rotating member is positioned more rearwardly in a cutting direction than a center of the plunger so that during an operation of attaching or detaching the blade, the plunger can rock in a direction along which the plunger separates from a roller that is provided for abutting against the blade.

13. The electric-powered cutting machine according to claim 1,
 wherein said rotation center of the rotating member is at a position which is separated from an outer periphery of the plunger, and
 wherein a place where the pressing member presses the rotating member is set to a vicinity of an end portion of the rotating member.

14. The electric-powered cutting machine according to claim 1, wherein the line is perpendicular to the longitudinal direction of the blade.

15. The electric-powered cutting machine according to claim 1, wherein the line extends along a longitudinal side surface in a cross-section of the blade, the cross-section being defined in the longitudinal direction of the blade.

16. An electric-powered cutting machine, comprising:
 a housing;
 a plunger held by the housing and protruding outwardly therefrom, the plunger being driven to reciprocate;
 an operation member rotatably mounted on the housing about a rotating fulcrum of the operation member; and
 a blade holding mechanism disposed at a tip end portion of the plunger, the blade holding mechanism detachably attaching a blade to the plunger, the blade comprising a pair of projections,
 wherein the blade holding mechanism comprises:
 a rotating member capable of rotating, wherein the blade is detachable from the plunger by rotating of the rotating member by applying a leverage thereto; and
 a blade receiving portion including an engaging portion that engages with the projections of the blade, wherein the blade is attachable to the plunger by the rotating member by applying the leverage thereto, wherein an abutting portion of said operation member and an operation portion of said operation member are disposed at different ends of the operation member with respect to the rotating fulcrum of the operation member, wherein the rotating member comprises:
- a rotation center around which the rotating member is rotated;
- a first end being urged by a pressing member to press the blade; and
- a second end that is abutted by the abutting portion, wherein, when the operation member is rotated in a direction away from an initial position, the initial position being at a rotation end point, the rotating member is rotated through a contact between the abutting portion and the second end so that a pressing force applied from the first end to the blade is released, thereby detaching the blade from the plunger, wherein, when the blade is attached to the blade receiving portion of the blade holding mechanism, the blade is clamped by the blade receiving portion and the first end of the rotating member, and the projections of the blade arc engaged with the engaging portion of the blade receiving portion, thereby preventing the blade from moving downward, wherein, when the operation member is in the initial position, the abutting portion, a rotating fulcrum of the operation member, and the second end are positioned at one side of a line extending along a side surface of the blade, and the operation portion is positioned at another side of the line, and wherein, when viewed from a longitudinal direction of the blade, a distance from the operation portion to the rotating fulcrum is more than two times of a distance from the abutting portion to the rotating fulcrum.

17. The electric-powered cutting machine according to claim 16, wherein the line is perpendicular to the longitudinal direction of the blade.

* * * * *